No. 679,602. Patented July 30, 1901.
B. B. CHANDLER, Jr.
CENTER LINE LEVEL.
(Application filed Dec. 26, 1900.)
(No Model.)
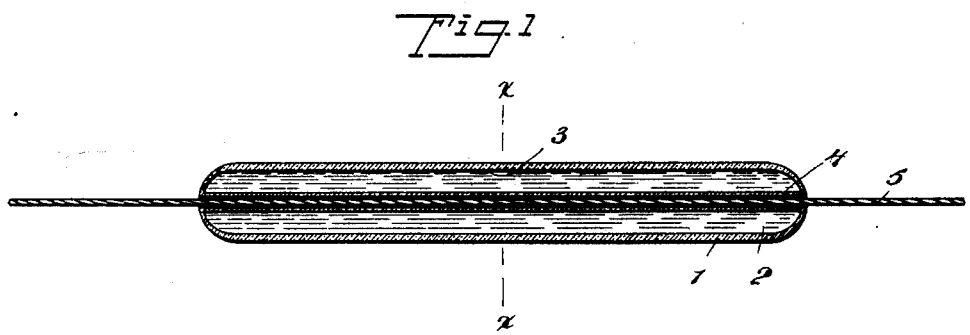
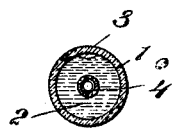
WITNESSES:
INVENTOR
Bartlett B. Chandler, Jr.
BY
ATTORNEYS

UNITED STATES PATENT OFFICE.

BARTLETT B. CHANDLER, JR., OF NEVADA CITY, CALIFORNIA.

CENTER-LINE LEVEL.

SPECIFICATION forming part of Letters Patent No. 679,602, dated July 30, 1901.

Application filed December 26, 1900. Serial No. 41,070. (No model.)

*To all whom it may concern:*

Be it known that I, BARTLETT B. CHANDLER, Jr., a citizen of the United States, and a resident of Nevada City, in the county of Nevada and State of California, have invented a new and Improved Center-Line Level, of which the following is a full, clear, and exact description.

This invention relates to improvements in center-line levels designed for use by carpenters, bricklayers, machinists, and the like; and the object is to provide a level of simple construction that may be mounted on and slid along a centering-line.

I will describe a center-line level embodying my invention and then point out the novel features in the appended claims.

Reference is to be had to the accompanying drawings, forming a part of this specification, in which similar characters of reference indicate corresponding parts in both the figures.

Figure 1 is a longitudinal section of a center-line level embodying my invention, and Fig. 2 is a section on the line $x$ $x$ of Fig. 1.

The level comprises a glass tube 1, closed at its ends, and in which is placed a liquid 2, such as mercury or spirits, and in which the bulb 3 is formed in the usual manner. Extended longitudinally through the center of the tube 1 is a tube 4, through which the line 5 may pass.

A center-line level embodying my invention may be readily passed or slid along the line, and as it is made entirely of glass the bulb may be seen at the top should the tube be rotated or turned axially on the line.

Having thus described my invention, I claim as new and desire to secure by Letters Patent—

1. A center-line level, comprising a glass tube closed at its ends, a liquid in the tube, and a tube extended axially through the first-named tube and through which a line may pass, substantially as specified.

2. A center-line level, consisting of a glass tube adapted to slide on a line extended through its longitudinal center and also to rotate thereon, a liquid inclosed in the tube, and means for holding the liquid out of contact with the line, substantially as specified.

3. A center-line level, comprising a cylindrical transparent tube, closed at its ends, mercury in the transparent tube, and a tube extended axially through the transparent tube, substantially as specified.

In testimony whereof I have signed my name to this specification in the presence of two subscribing witnesses.

BARTLETT B. CHANDLER, JR.

Witnesses:
L. M. HANCOCK,
J. A. HANCOCK.